Sept. 23, 1930.  T. M. SIQUELAND  1,776,339
VARIABLE SPEED TRANSMISSION
Filed March 11, 1929   4 Sheets-Sheet 3

INVENTOR.
TOBIAS M. SIQUELAND.
BY Townsend, Loftus & Abbett.
ATTORNEYS

Sept. 23, 1930.   T. M. SIQUELAND   1,776,339
VARIABLE SPEED TRANSMISSION
Filed March 11, 1929   4 Sheets-Sheet 4
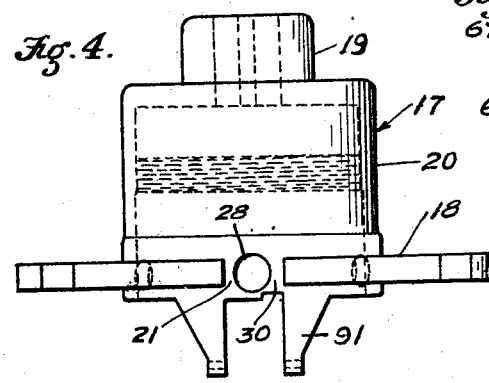
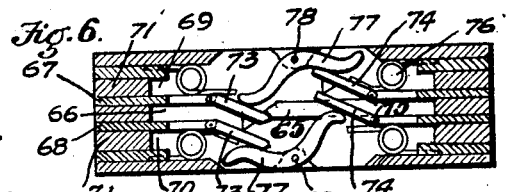
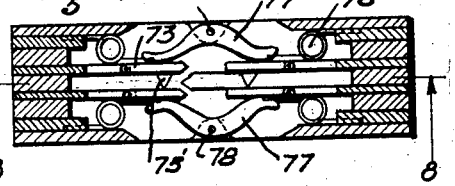
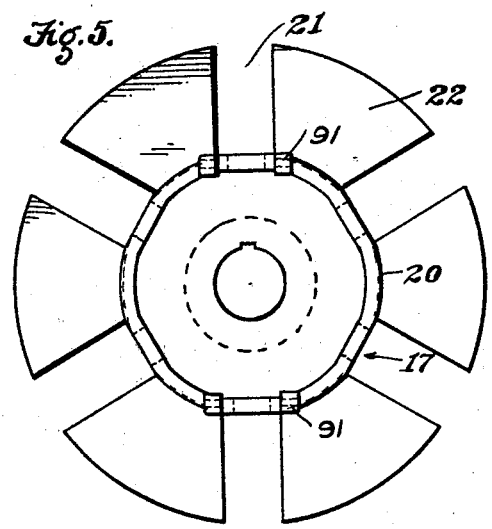
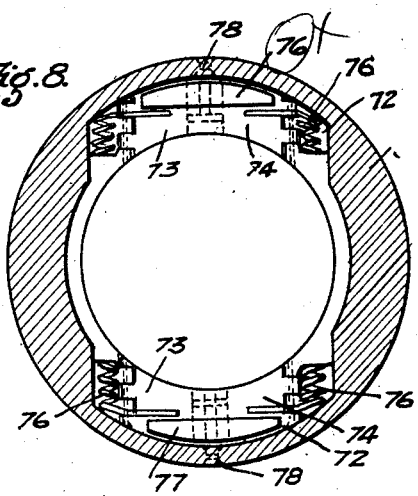
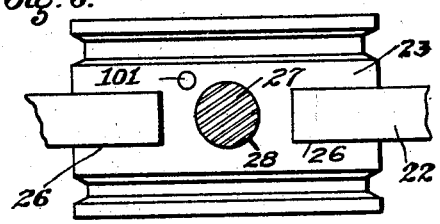
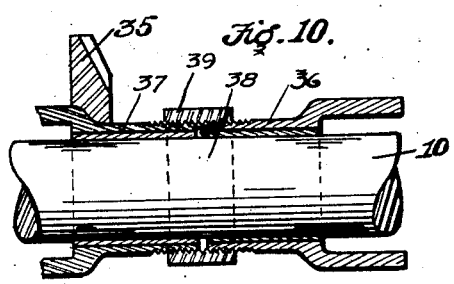
INVENTOR.
TOBIAS M. SIQUELAND
BY Townsend, Loftus & Abbett
ATTORNEYS.

Patented Sept. 23, 1930

1,776,339

UNITED STATES PATENT OFFICE

TOBIAS M. SIQUELAND, OF LOS ANGELES, CALIFORNIA

VARIABLE-SPEED TRANSMISSION

Application filed March 11, 1929. Serial No. 345,980.

This invention relates to power transmission mechanism, and particularly pertains to a variable speed transmission unit.

It is the principal object of the present invention to provide means for transmitting power from a driving to a driven shaft, and which structure embodies means whereby any desired driving ratio may be established between the two shafts without interrupting the driving operation, and while acting in an automatic manner to create desired variations in the driving speed ratio of the two shafts in the event that excessive overload is placed upon the mechanism being driven, or when the load is suddenly relieved to cause the driving mechanism to race.

The present invention contemplates provision of a driving shaft and a driven shaft, preferably disposed in parallel relation to each other. Said shafts carrying segmental sheaves, the segments of which may be actuated by power driven means to move radially, and to thus vary the effective outside diameter of the sheaves on the two shafts in inverse ratio to each other, so that an endless cable or driving belt passing around the sheaves will cause the shafts to rotate at varying driving ratios. The structure further contemplating the use of a governor, automatically operating to shift the sheave segments under varying load conditions.

The invention is illustrated by way of example in the accompanying drawings, in which :—

Fig. 4 is a view showing the detail of the sheave spider as seen in side elevation.

Fig. 5 is a view showing the detail of said spider as seen in end elevation.

Fig. 6 is an enlarged view in elevation showing the shifting mechanism when the parts are in a shifting position.

Fig. 7 is an enlarged view similar to Fig. 6 showing the shifting mechanism when the parts thereof are in a neutral position.

Fig. 8 is an enlarged view in transverse mechanism through the shifting device as seen on the line 8—8 of Fig. 7.

Fig. 9 is an enlarged fragmentary view in section taken on the line 9—9 of Fig. 2.

Fig. 10 is an enlarged fragmentary view showing the coupling between the shifting sleeve sections.

Figure 1:
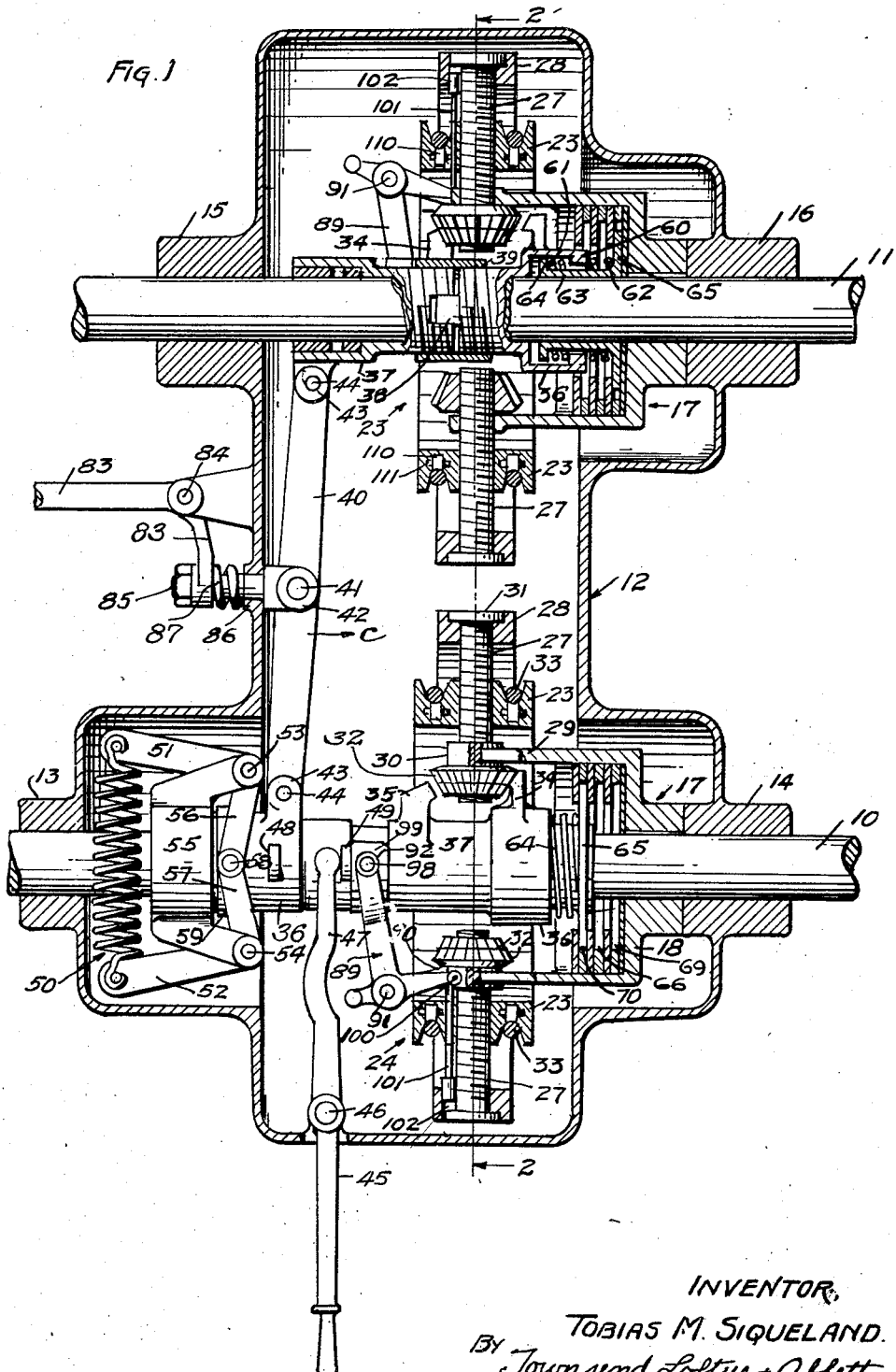
Fig. 1 is a view in transverse central section through the transmission mechanism with which the present invention is concerned.

Referring more particularly to the drawings, 10 indicates a driving shaft connected with a suitable source of power not shown in the drawings. 11 indicates a driven shaft adapted to receive driving rotation from the shaft 10. As shown in Fig. 1 of the drawings, these shafts are disposed in spaced parallel relation to each other and are mounted within a transmission housing 12. At one end of the housing are bearings 13 and 14 rotatably supporting the driving shaft 10. Near the opposite end of the housing are bearings 15 and 16 rotatably supporting the driven shaft 11. Mounted upon the shaft 10 is a hub structure 17 which is keyed therethrough and carries a disc 18. The details of construction of this element are more particularly shown in Figs. 4 and 5, where it will be seen that the hub structure includes a hub 19 through which the shaft 10 extends and within which it is keyed, and an enlarged drum portion 20 to receive the shifting mechanism to be hereinafter described.

Figure 2:
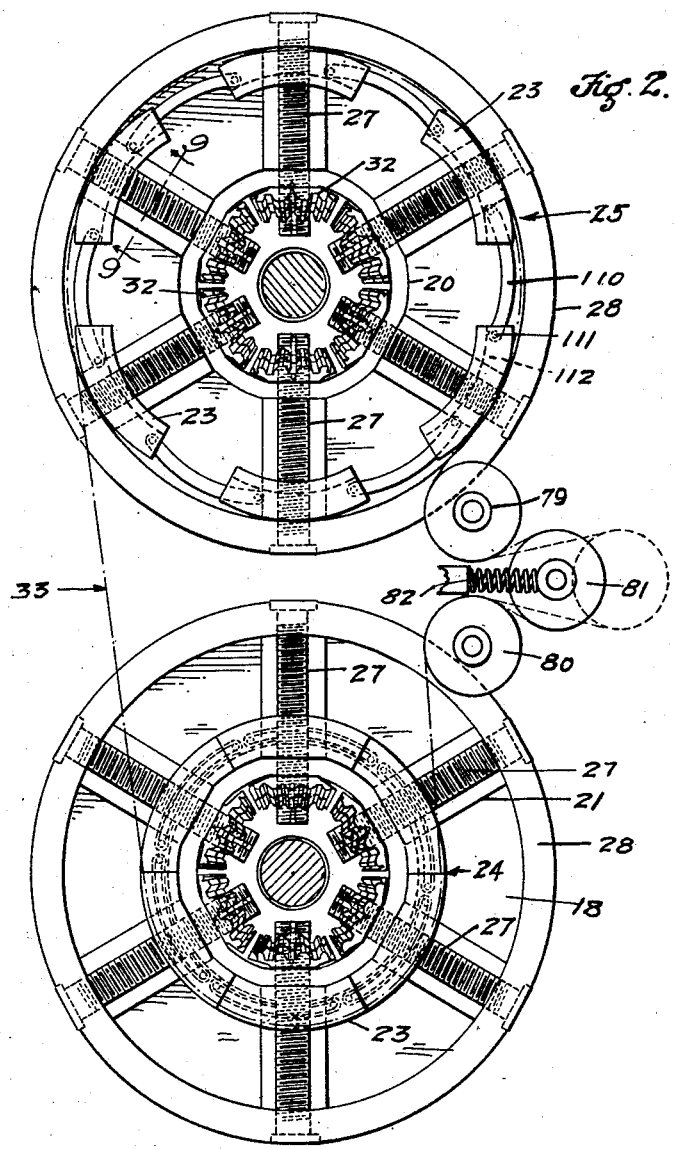
Fig. 2 is a view in section through the transmission mechanism as seen on the line 2—2 of Fig. 1, and more particularly disclosing the construction of the sheaves.

The disc 18 is formed with a plurality of radial slots 21, which extend outwardly from the boundary of the drum 20 and subdivide the disc into a plurality of guide segments 22. As here shown there are six of the metal slots 21 in the disc 18. Each of these slots accommodates a sheave segment 23 forming part of the composite driving sheave 24 as more particularly shown in Fig. 2 of the drawings. It will also be understood that segmental sheave segments 23 form the composite driven sheave 25 carried upon the driven shaft 11. The sheave segments 23 in the driving sheave 24 are capable of radial movement as guided along the slots 21, and are thus supported as shown in the fragmentary view in Fig. 9, where it will be seen that the opposite radial faces of the sheave segment 23 is grooved as indicated at 26, to receive the guide segments 22. These segments are moved radially by radial screws 27, one of which extends longitudinally of each of the slots 21 in the disc 18. The outer ends of these screws are carried in a ring 28 of relatively large diameter as compared with the maximum diameter of the segmental sheave 24. The inner ends of the screws pass through extension arms 29, formed as part of the drum 20 and having bearing portions 30 through which the screws extend and within which they may freely rotate. A head 31 prevents inward longitudinal movement of each screw and a pinion 32 keyed to the end of the screw prevents outward longitudinal movement of each screw. It will thus be evident that as the pinion gears 32 are rotated the screws will be rotated with the longitudinal movement.

Each of the screws 27 pass through threaded openings 28, one of which occurs in each of the sheave segments 23, and since the sheave segments cannot rotate as shown in Fig. 9, it will be evident that rotation of the respective sheave screws will cause the segments to move longitudinally of the screw as guided along their slots 21 in the guide plate 18.

The sheave structure 24 including the hub member 19 with its drum 20 and carrying a set of the radial screws 27 and the sheave segments 23 mounted thereon, will rotate with the driving shaft and around the axis thereof. This will cause the pinions 32 of the screws 27 to have a planetary action around the axis of the shaft 10.

The segmental sheaves 24 and 25 may be designed with any number of grooves to receive endless flexible driving members here generally indicated at 33 in the drawings. These driving members may be endless cables, ropes or belts, and in the present structure the sheave segments are shown with grooves in their circumferential edge and upon opposite sides of the radial screws 27 so that a balanced strain will be imposed upon the sheave structures and will not tend to cramp or jam the threads of the screw.

It is one of the principal objects of this invention to provide means for alternately increasing and decreasing the outside diameters of the segmental sheaves 24 and 25 so that the flexible driving members 33 may impart a desired variable driving speed from the driving shaft 10 to the driven shaft 11. It is therefore, desirable to find some means whereby the sets of sheave screws 27 on the segmental sheaves 24 and 25 may be caused to rotate in opposite directions; one set acting to move the sheave segments radially and inwardly to reduce the diameter of that particular sheave, and the other set of screws acting to move the sheave segments mounted thereon radially and outwardly to increase the diameter of that particular sheave.

It has also been found desirable to progressively move successive sheave segments a predetermined increment and at a point in the path of travel of the segments at which said segment is not in contact with the driving cable 33, thus making it possible to move the segment outwardly without the resistance of the cable tension. The structure provided for this purpose comprises a forward stationary gear tooth 34 and a reverse stationary gear tooth 35. These two teeth occur upon opposite sides of the plane of the axes of the radial screws 27 and they lie in a plane intersecting the driving and driven shafts and on adjacent sides thereof. The forward gear tooth 35 is carried upon a sleeve section 36 through which the driving shaft 10 freely rotates and upon which shaft it may have limited longitudinal movement. The other gear tooth 34 is mounted upon a sleeve section 37 and is disposed upon the driving shaft 10 adjacent the sleeve section 36. These adjacent ends of the sleeve sections 36 and 37 interlock with teeth 38 and may be longitudinally adjusted and set with relation to each other by a threaded collar 39 whereby the distance between the forward tooth 35 and the reverse tooth 34 may be adjusted. It will be understood that the teeth 34 and 35 are disposed upon diametrically opposite sides of the pinions 32 and that they are spaced apart a sufficient distance to permit them to be separately and alternately moved to positions whereby they may mesh with the successive pinions 32 as the sheave structures rotate. In order to facilitate the meshing of the stationary teeth 34 and 35 with the pinions, the outer ends of the teeth are "backed off" with a clearance of approximately 15 degrees, so that it will be easier for the teeth of the pinion to properly mesh with the teeth 34 and 35 as the pinions move along their planetary orbit. This construction is particularly shown in Fig. 11 of the drawings.

It is to be understood that the sheave structures 24 and 25 are of identical construction, but that the sheave structure mounted upon the driven shaft 11 is so adjusted that its operation is always opposite to the operation of the sheave structure 24 on the driving shaft 10. That is to say that at a time when the pinions 32 of the sheave structure 24 are rotating the screws 27 to move the sheave segments 23 outwardly and thus to enlarge the sheave 24, the pinions 32 of the sheave structure 25 will rotate the screws 27 of that structure to move the sheave segments 23 inwardly thus decreasing the effective diameter of the sheave structure 25, while the effective diameter of the sheave structure 24 is increasing. This action is brought about due to the fact that the sleeve structure comprising sleeve sections 36 and 37, as they are mounted upon driving shaft 10 are simultaneously moved in alternate directions by a shifting lever 40 which is mounted upon a pivot pin 41 disposed midway between the shafts 10 and 11, and which is carried upon a bearing structure 42. The opposite ends of the lever 40 are pivoted to lugs 43 by pins 44. These lugs are formed as a part of the sleeve structures and are here shown as formed integral with the sleeve sections 37.

By alternate shifting movement of the sleeves the shifting gear teeth 34 and 35 of the sleeves will be alternately moved to stand in a position of engagement with opposite sides of the pinions 32 upon the separate sheave units 34 and 35 and will thus act to rotate these pinions in opposite directions.

The present invention contemplates that it may be desirable to manually shift the sleeves for varying the driving ratio existing between the sheave units 24 and 25 at the option of the operator. This may be done by hand control lever 45 which is mounted upon a pivot pin 46 in the housing 12 of the transmission and which is formed with a forked lever extension 47 partially embracing the sleeve section 37 upon the driving shaft 10. This sleeve section carries shifting lugs 48 and 49 spaced a distance apart longitudnally of the sleeve 37 on shaft 10 and adapted to be alternately engaged by the forked end of the lever 47, so that the sleeve may have some independent latitude of movement, but may be actuated by the operating lever 45 when desired. The independent operation of the shifting sleeve upon the driving shaft 10 is necessary in order to permit a governor structure 50 to automatically operate the sleeve and thus vary driving speeds by changing the gear ratio between the sheave units 24 and 25 as the transmission is driven. This governor is here shown as comprising a pair of centrifugal counterweight arms 51 and 52, extending longitudinally of shaft 10 and mounted upon pivots 53 and 54, carried by a bearing structure 55, which is keyed upon the driving shaft 10.

Levers 56 and 57 are formed as continuations of the counterweight levers to complete bell crank structures. The ends of the levers 56 and 57 engage pins 58 carried by a loose collar 58' on the sleeve member 37 of driving shaft 10 and as the bell cranks are swung will act to shift this lever automatically.

A governor spring 59 is secured to the free ends of the counterweight levers 51 and 52 and will determine the amount of centrifugal action required to move the bell cranks from a predetermined position and shift the sleeves.

While it is possible to shift the sleeve structure comprising sleeve sections 36 and 37, by the operating lever 45 or the governor 50, it is necessary to insure that the shifting operation will occur in such a manner and with relation to the operating pinions 32 and the fixed teeth 34 and 35, so as to cause engagement of the successive pinions with the stationary teeth 34 and 35 in a manner to prevent clashing of the teeth. In order to accomplish this, a collar 60 is secured within the enlarged end portion of sleeve section 36 and provides a shoulder upon the opposite sides of which helical springs 61 and 62 are mounted. These springs circumscribe bushings 63 carried upon the shafts 10 and 11. Thus, the sleeve structures will be free to move in alternate directions against the compression of one or the other of the springs 61 or 62. The spring 61 abuts against a shoulder 64 on the bushing 63, and the spring 62 abuts against a shoulder on a shifting finger 65. The finger 65 is more clearly shown in Figs. 6 to 8, inclusive, of the drawings. This finger normally stands in a neutral position, at which time both of the stationary teeth 34 and 35 are out of mesh with the pinions 32 and are inoperative with relation thereto. This position is particularly illustrated in Fig. 3 of the drawings, in which view the sheave unit of drive shaft 10 is shown in its neutral position. Here it will be seen that the finger 65 stands in an intermediate annular groove 66 defined upon opposite sides by discs 67 and 68, and that upon the outer sides of these discs are annular grooves 69 and 70. The discs are spaced apart by suitable spacing rings 71, and are mounted within the enlarged portion 20 of the hub structure 17 and are designed to rotate therewith; it being understood that the shifting finger 65 is stationary with relation to rotation of the shaft 10 and that it can merely have a limited longitudinal movement relative to the shaft sufficient to permit one or the other of the teeth 34 or 35 to move to their operative positions upon opposite sides of the pinions 32.

As shown in Figs. 6 and 7 of the drawings, the discs 67 and 68 do not form continuous partition walls between the intermediate annular groove 66 and the outer annular grooves 69 and 70, but are cut away as indicated at 72, to accommodate gate members 73 and 74 which are mounted upon pivot pins 75 and which partially close the cut away portion 72 in the discs and held apart by lugs 75'. These gate members are held in longitudinally aligned positions by spring 76 and may be alternately operated by a double ended lever 77 carried upon a pivot 78 disposed midway of its length. Under normal conditions, as before stated, the shifting finger 65 is disposed as shown in Fig. 7 of the drawings and when shifted will produce pressure against one of the gates 74 to swing the lever in an opposite direction, thus producing a throat along which the finger 65 may pass into one or the other annular grooves 69 or 70.

In the operation of the device it will be evident that the two sheave units 24 and 25 may not at all times maintain the exact driving ratio intended and that the driving element 33 may become slack. In order to maintain this element in a taut position it is passed around idler pulleys 79 and 80, and a tightening pulley 81. The tightening pulley is actuated by a spring 82 to create a desired tension upon the driving element 33. In some instances this will not be sufficient to compensate for minute variations between the sheave units 24 and 25, and means are provided to adjust the operation of the sheave units with relation to each other, which comprises a lever 83 mounted upon a pivot 84 spanning a stud 85 which extends through bearing 86. A spring 87 is interposed between the bearing and the lever 83 and normally holds the lever in its outermost position. This stud carries the bearing 42 through which pin 41 is mounted. When pressure of spring 87 is relieved by moving lever 83 the shifting mechanism is rendered inoperative to permit segments of both sheaves to move to the limits of their travel, as controlled by a trip mechanism hereinafter described, to correct inaccuracy of adjustment in the sheaves.

Figures 3, 11:
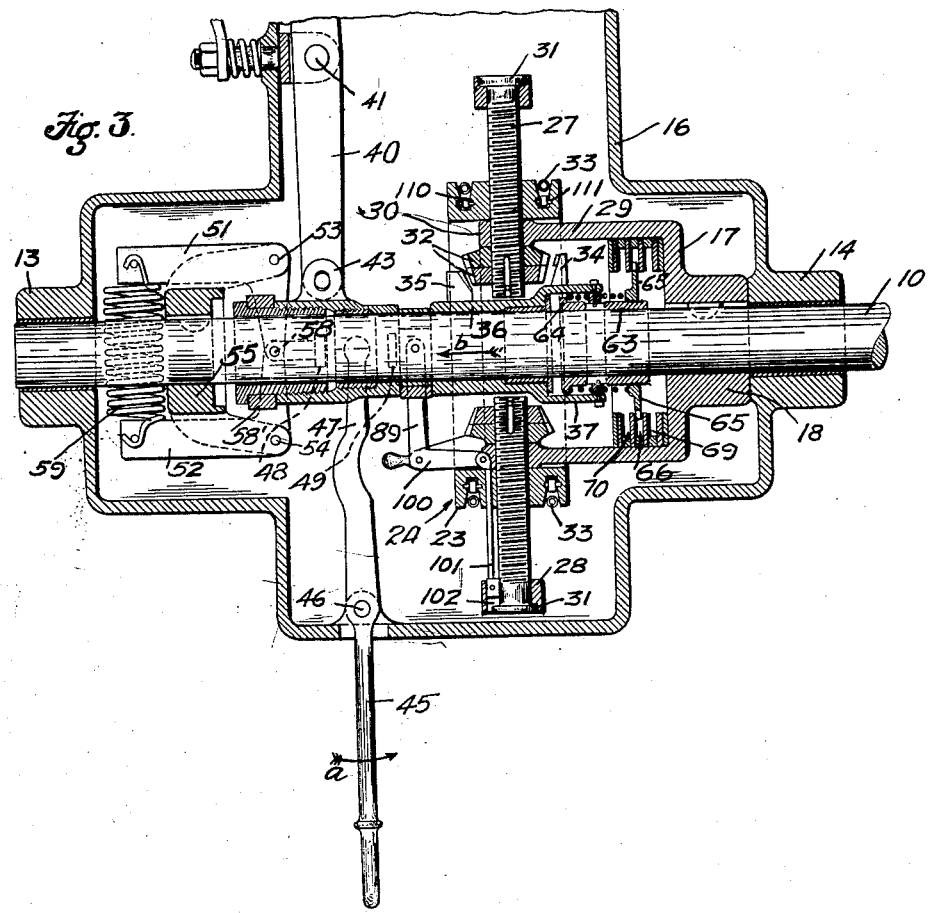
Fig. 3 is a fragmentary view in transverse section showing the driving unit of the transmission mechanism with the parts in their neutral position.
Fig. 11 is an enlarged fragmentary view showing the manner in which the teeth of the screw pinions are specially formed.

It will also be evident that some means must be provided for interrupting the driving movement of the screws 27 on the sheaves so that when the sheave sections of either sheave unit have moved to their extreme innermost or outermost positions, the driving operation will be interrupted and the stationary teeth 34 and 35 which are effecting this motion will be moved out of operative relation to the pinions 32. A structure for accomplishing this result is incorporated in each of the sheave units and is shown in Figs. 1 and 3, as comprising a bell crank 89 mounted upon a pivot 90, carried by an arm 91 extending from bearing arm 29 of the driving hub structure 17. This bell crank has a shifting yoke 92 partially embracing the sleeve unit 37, and which yoke engages trunnions 98 upon a collar 99, mounted in a groove extending circumferentially of the sleeve 37 and by which the sleeve 37 may be reciprocated upon the shaft 10. The other arm of the bell crank 89, as indicated at 100 is pivoted to a shifting rod 101 extending outwardly and parallel to one of the screws 27 and terminating in an enlarged outer end slidably mounted in an opening 102 formed in the ring 28. This shifting rod 101 extends through an opening in the sheave segment and when this particular sheave segment 23 has moved to its outermost position it will encounter the shoulder on the enlarged end of the shifting rod 101 to pull on the rod swinging the bell crank and shifting the sleeve 37. When the sheave segment moves to its innermost position it will encounter the arm 100 of the bell crank and swing it to shift the sleeve 37 in the opposite direction.

In operation of the present invention the device is assembled as shown in Fig. 1 of the drawings. The drive shaft 10 is operatively connected with a desired source of power supply by which it is rotated. The driven shaft 11 is suitably connected with means to be driven. In some cases it may be desirable to interpose the device between a source of supply and a transmission mechanism. Assuming that the drive shaft is rotating at a constant rate of speed, it is, of course, desirable to initially rotate the driven shaft at its lowest rate of speed under which conditions the sheave unit 24 on the drive shaft will be contracted to its smallest diameter and the sheave unit 25 on the driven shaft will be expanded to its largest diameter. Under these conditions the shifting finger 65 will stand in its neutral position within the groove 66 of the shifting mechanism housed within the drum 20 of the hub structure 17. This gear ratio will be maintained so long as the teeth 34 and 35 remain in inoperative positions with relation to the pinions 32. After the mechanism has attained momentum it is desirable to accelerate the speed of the driven shaft. This may be manually accomplished by swinging the operating lever 45 in the direction of the arrow "a" in Fig. 3 of the drawings. This will cause the shifting lever 47 to abut against lug 48 carried upon the sleeve section 37 and will move the sleeve in the direction of the arrow "b" as indicated in Fig. 3. While so moving, the collar 60 within the end of sleeve section 36 will press against the spring 61 which in turn will exert pressure against the shoulder on the end of bushing 63 and will tend to move the shifting finger 65 in the direction of the previously mentioned arrow "b". This finger cannot, however, move longitudinally of the shaft 10 until it reaches the cut away portion 72 shown in Fig. 8; it being previously obstructed in its movement by the disc member 68. When the disc structures move around until the cut away portion 72 registers with the finger 65, pressure will be exerted upon the gate 74 of disc 68 to swing the gate outwardly, thus exerting pressure against one arm of the double lever 77, causing the other arm of that lever to swing oppositely and thereby deflect the gate member 73 so that the finger will find its way into the groove 70 where it will remain so long as pressure is exerted on the sleeve 36 in the direction of the arrow "b". As the finger 65 moves into groove 70 the spring 62 will exert a force against the collar 36 of the drum 20 and will thus force the sleeve 36 endwise to move the tooth 35 into a position to be encountered by and to mesh with the pinions 32. The entire sheave unit 24 will rotate with the shaft 10 and the pinions 32 will successively engage the tooth 35 as they move along their planetary path of travel. During the period of engagement or meshing of a pinion 32 with the tooth 35 the pinion will be rotated a predetermined increment of advance. It will thus be evident that all of the sheave segments are not simultaneously moved to enlarge or reduce the effective diameter of the sheave, but that they are successively moved during the period of their travel when they are not in contact with the driving unit 33 and at which time they may move freely upon their respective screws without the burden of driving tension or pressure.

Simultaneous with the expansion of the sheave unit 24 the lever 40 is swung in the direction of the arrow "c" as indicated in Fig. 1, so that when the gear 35 of the sheave unit 24 is in an operative engagement with the pinions 32 of that unit, the gear tooth 35 of the driven sheave unit 25 will engage the pinions 32 of that sheave unit upon the diametrically opposite side from that of the engagement on the sheave unit 24 so that the screw 27 will rotate in a counter direction to the simultaneous rotating screw 27 of the sheave unit 24. This will act to cause the sheave unit 25 to contract as the sheave unit 24 expands, thus establishing an accelerated speed of rotation for the shaft 11. This transition will continue so long as the finger 65 remains in the groove 70. This finger may be caused to move out of this groove by manipulation of the operating lever 45 to shift the finger in a counter-direction of that indicated by the arrow "b", so that the finger may move through gates and into neutral groove 66, or it may be automatically shifted when the segment 23 of the unit 24 encounters the shoulder on the rod 101, which will act to swing the bell crank 89 and to shift the sleeve 36 so that the gear tooth 35 will be out of operative position with relation to the pinions 32. It will be evident that when it is desired to invert the driving ratio thus established, the operating lever 45 may be swung to cause the finger 65 to move through the gates 73 and 74 and into the groove 69 at which time the teeth 34 on the sleeves will be in a position to mesh with the pinions 32 of their respective units. During this time the unit 24 will expand while the unit 25 contacts. Attention is directed to the fact that the structure including the shifting finger 65 and the grooves 69 and 70 will act to cause actuation of the segments of a sheave during a complete revolution of the sheave before the finger 65 may be shifted again. This is due to the gate structure at one point in the discs and through which the finger must pass.

In the operation of certain classes of machinery it may be desirable to interpose this device between the engine and a transmission mechanism to automatically vary the gear ratio existing between the drive shaft 10 and driven shaft 11 without the necessity of shifting the gears of the final transmission. This might become necessary in the operation of a tractor when an unexpected resistance is encountered which would throw a sudden load on the driving mechanism and tend to produce undue strain on the parts of the driving structure, at which time the governor 50 would act to shift the sleeve 37 and to automatically reduce the driving ratio so that additional power would be given to the shaft 11. It will be evident that after this resistance has been relieved the governor would automatically react to restore the parts to their original driving ratio.

It will thus be seen that the structure here disclosed provides simple means imparting rotation from a driving shaft to a driven shaft and for making it possible to vary the gear ratio existing between the two shafts by establishing any desired intermediate ratio from a minimum rotation of the driven shaft to a maximum rotation without being limited by the sizes or numbers of gears and without the necessity of shifting and clashing of gears and imposing strains thereon.

It may be found desirable to provide a continuous support for the element 33, both along the outer edge of the sheave segments and the intervening space in which cases bridges 110 are provided. These members are arcuate in longitudinal formation, and are provided with transversely extending pins 111 in their opposite ends which may move along grooves 112 in the sheave segments.

It will also be evident that the variable speed transmission will lend itself particularly to automatic operation, so that the transmission will adjust itself to variation in load imposed thereupon without the necessity of manual shifting of the gears.

While I have shown the preferred form of my invention, as now known to me, it will be understood that various changes might be made in the combination, construction and arrangement of parts, by those skilled in the art without departing from the spirit of the invention as shown.

Having thus described my invention, what I claim and desire to secure by Letters Patent is:—

1. A device of the character described comprising a rotating shaft, a sheave mounted thereupon to rotate in unison with the same, said sheave comprising a plurality of sheave segments around which an endless driving member may pass, individual carrying means for the several sheave segments, means for rotating said carrying means to cause the individual segments to move radially, means affecting said actuating means, means to cause successive radial movement of the sheave segments as said segments pass a point in the continuous rotation of the sheave and means whereby action of said operating means cannot be interrupted except and until all of said sheave segments have been moved an equal distance and the sheave has rotated a complete and exact revolution.

2. A device of the character described comprising a drive shaft and a driven shaft, a segmental sheave on the drive shaft, a segmental sheave on the driven shaft, both of said sheaves being capable of expansion and contraction due to radial movement of their several segments, an endless drive member passing around both of said sheaves and imparting motion from one sheave to the other, means for causing the segments of the sheaves to successively move radially with relation to the axes as the sheaves continue to rotate, means whereby the sheaves may be simultaneously and alternately enlarged and contracted in diameter, and means for automatically operating said last named means under varying conditions of load imposed upon the driven shaft.

3. A variable speed power transmission comprising a drive shaft and a driven shaft, a segmental sheave unit mounted upon the drive shaft, a segmental sheave unit mounted upon the driven shaft, said sheave units comprising a hub structure carrying a plurality of sheave segments and means whereby said segments may be moved radially with relation to their axes as the sheave rotates, control means for actuating said radial operating means to cause the sheave segments on the sheave units to move in opposite directions whereby the outside diameter of one sheave unit will increase while the outside diameter of the other sheave unit is simultaneously decreased, a continuous driving element passing around said sheaves, and said segment operating means being designed to bring about radial movement of successive sheave segments at a point at which the driving element is out of contact with the segment being moved.

4. In a variable speed transmission mechanism a shaft, a composite sheave thereon and fixed with relation thereto, said sheave comprising a hub structure, a plurality of radially extending screws carried by said hub structure and rotatably mounted with relation thereto, driving pinions one of which is mounted on the inner end of each of said screws and all of which are in a plane at right angles to the axis of the shaft, sheave segments one of which is threaded onto each of the screws and will move radially with relation to the axis of the shaft when the screw is rotated and a stationary tooth member adapted to be moved into the path of travel of the peripheries of the pinions whereby they may momentarily and consecutively encounter said tooth to be rotated a predetermined degree of rotation to produce a corresponding rotation of the screw and a resulting radial movement of the sheave segment mounted thereon.

5. In a variable speed transmission mechanism a shaft, a composite sheave thereon and fixed with relation thereto, said sheave comprising a hub structure, a plurality of radially extending screws carried by said hub structure and rotatably mounted with relation thereto, driving pinions one of which is mounted on the inner end of each of said screws and all of which are in a plane at right angles to the axis of the shaft, sheave segments one of which is threaded onto each of the screws and will move radially with relation to the axis of the shaft when the screw is rotated and a pair of stationary teeth disposed upon diametrically opposite sides of the path of travel of the pinions and adapted to be shifted so that one of said teeth may be positioned in the path of travel of the peripheries of the pinions whereby said pinions will successively encounter said tooth to rotate the pinion a desired degree of rotation and thereby actuate the screw upon which said pinion is mounted to move its segment radially.

6. A device of the character described, a shaft, a hub structure thereon, screws carried by the hub structure and extending radially from the axis of the shaft and in a plane at right angles thereto, pinions positioned upon the inner ends of each of said screws, a sleeve on the shaft and held against rotation with relation thereto, a pair of gear teeth carried by the sleeve and disposed upon opposite sides of the pinions whereby alternate movement of the sleeve will bring one of said teeth into a position to be engaged by the teeth on one side of the pinions as they rotate with the shaft, and yieldable means automatically acting to shift said sleeve at a predetermined point in the rotation of the hub structure and the pinions carried thereby.

7. In a device of the character described, a shaft, a gear supported from the shaft and moving therewith with its central axis at right angles to the longitudinal axis of the shaft, means adapted to be disposed in the path of travel of the gear and at a point therealong whereby said gear will be rotated a predetermined degree of rotation as it passes said means and means for insuring that said member is interposed in the path of travel of said gear in synchronism with the movement of the gear whereby said means will precisely mesh therewith.

8. In a device of the character described, a shaft, a gear supported from the shaft and moving therewith with its central axis at right angles to the longitudinal axis of the shaft, means adapted to be disposed in the path of travel of the gear and at a point therealong whereby said gear will be rotated a predetermined degree of rotation as it passes said means, means for insuring that said member is interposed in the path of travel of said gear in synchronism with the movement of the gear whereby said means will precisely mesh therewith, and means for maintaining said gear actuating member in the path of travel of the gear for a complete and exact revolution of the shaft before moving said member from its operative position with relation to its path.

9. In a device of the character described, a shaft, a hub structure carried thereby and rotatable therewith, a plurality of screws rotatably supported by said hub structure and extending radially with relation to the longitudinal axis of the shaft and in a plane at right angles thereto, gears, one secured to the end of each of said screws, a gear element movable longitudinally of the shaft and adapted to be moved into the path of travel of the gears and in a position therealong to be successively encountered by said gears as they pass said element and whereby they will be rotated a predetermined degree of rotation, shifting means for moving said gear element and holding means for said shifting means adapted to withhold operation of the shafting means until a predetermined point in the travel of the gears whereby they will precisely mesh therewith and for then holding said element in its operative position until one or more complete revolutions of the shaft have been made.

10. In combination with a rotatable shaft supporting a gear disposed with its longitudinal axis at right angles to the longitudinal axis of the shaft and moving therewith, a non-rotatable sleeve longitudinally slidable upon the shaft, a gear tooth carried by the sleeve and adapted to be moved into or out of the path of travel of said gear whereby engagement therewith will produce a desired degree of rotation of the gear as said gear passes said tooth, a shifting sleeve mounted upon the shaft and adapted to be shifted longitudinally thereof, yieldable means through which motion of the main sleeve may actuate the shifting sleeve, a radial finger carried by the shifting sleeve, a pair of ring members spaced from each other and between which said finger is positioned as said ring members rotate with the shaft, a second pair of ring members disposed upon opposite sides of the first named ring members and forming grooves for receiving the finger and gates formed at points in the ring members and through which said finger may pass to register with the grooves formed by the said rings and the outer rings, thereby permitting longitudinal shifting movement of the shifting sleeve at said point and insuring that the sleeve will be held against shifting until the finger again reaches one of the gates.

11. A transmission mechanism comprising a driving shaft, a driven shaft, segmental sheaves on each of said shafts, means for actuating the segments of said sheaves as the sheaves and shafts rotate whereby to expand or contract the sheaves, means for operating said actuating mechanism to cause one sheave to expand while the other sheave contracts, and means for automatically interrupting said operation at the limit of travel of the sheave segments.

12. A transmission mechanism comprising a driving shaft, a driven shaft, segmental sheaves on each of said shafts, means for actuating the segments of said sheaves as the sheaves and shafts rotate whereby to expand or contract the sheaves, means for operating said actuating mechanism to cause one sheave to expand while the other sheave contracts, means for automatically interrupting said operation at the limit of travel of the sheave segments and means for rendering the operating means inoperative to permit the sheave segments to move to the limit of their travel when desired.

TOBIAS M. SIQUELAND.